United States Patent
Upstill et al.

(10) Patent No.: US 8,326,826 B1
(45) Date of Patent: Dec. 4, 2012

(54) NAVIGATIONAL RESOURCES FOR QUERIES

(75) Inventors: Trystan Upstill, Mountain View, CA (US); Henele I. Adams, Palo Alto, CA (US); Eric Lehman, Mountain View, CA (US); Neesha Subramaniam, Mountain View, CA (US); Wensi Xi, San Jose, CA (US); Sundeep Tirumalareddy, Santa Clara, CA (US)

(73) Assignee: Google Inc., Mountain View, CA (US)

( * ) Notice: Subject to any disclaimer, the term of this patent is extended or adjusted under 35 U.S.C. 154(b) by 503 days.

(21) Appl. No.: 12/354,426

(22) Filed: Jan. 15, 2009

Related U.S. Application Data

(60) Provisional application No. 61/144,129, filed on Jan. 12, 2009.

(51) Int. Cl.
*G06F 17/30* (2006.01)
*G06F 17/00* (2006.01)

(52) U.S. Cl. .................................... 707/723; 707/766
(58) Field of Classification Search ............ 707/723, 707/766, 999.1–6; 715/501.1, 512
See application file for complete search history.

(56) References Cited

U.S. PATENT DOCUMENTS

| | | | |
|---|---|---|---|
| 7,194,454 B2 | 3/2007 | Hansen et al. | |
| 7,266,546 B2 * | 9/2007 | Son | 1/1 |
| 7,444,327 B2 * | 10/2008 | Watson et al. | 1/1 |
| 7,739,274 B2 * | 6/2010 | Curtis et al. | 707/723 |
| 7,769,751 B1 * | 8/2010 | Wu et al. | 707/728 |
| 2007/0239729 A1 * | 10/2007 | Giallanza | 707/10 |

* cited by examiner

*Primary Examiner* — Yicun Wu
(74) *Attorney, Agent, or Firm* — Fish & Richardson P.C.

(57) ABSTRACT

Methods, systems, and apparatus, including computer program products, for identifying navigational resources for queries. In an aspect, a candidate query in a query sequence is selected, and a revised query subsequent to the candidate query in the query sequence is selected. If a quality score for the revised query is greater than a quality score threshold and a navigation score for the revised query is greater than a navigation score threshold, then a navigational resource for the revised query is identified and associated with the candidate query. The association specifies the navigational resource as being relevant to the candidate query in a search operation.

61 Claims, 7 Drawing Sheets

NAVIGATIONAL RESOURCES FOR QUERIES

CROSS-REFERENCE TO RELATED APPLICATIONS

This application claims the benefit under 35 U.S.C. §119 (e) of U.S. Patent Application No. 61/144,129, titled "Navigational Resources For Queries," filed Jan. 12, 2009, which is incorporated here by reference.

BACKGROUND

This specification relates to digital information retrieval, and particularly to processing search results.

The Internet enables access to a wide variety of resources, such as video or audio files, web pages for particular subjects, book articles, or news articles. A search engine can identify resources in response to a user query that includes one or more search terms or phrases. The search engine ranks the resources based on their relevance to the query and importance and provides search results that link to the identified resources, and orders the search results according to the rank. One example search engine is the Google™ search engine provided by Google Inc. of Mountain View, Calif., U.S.A.

Often a user searches for high quality information sources for a particular topic, but provides queries that cause the search engine to identify resources that vary in quality and across topics. For example, a user that desires access to Usenet groups may be unaware of the website "groups.google.com", which provides access to millions of postings of many Usenet groups. Furthermore, the user may be unaware of the term "Usenet", and therefore may not know how to form a query that is an accurate expression of the information desired. Thus, the user inputs the query "discussions" as an initial query to a search engine and receives many search results that are of little interest to the user. The user may then revise the query to "user discussions", and again receive search results that are of little interest. The user may continue to revise queries, entering queries in the following sequence: "user group discussions", "on-line discussion groups" and "internet discussion groups". After selecting several search results and doing some reading, the user becomes aware of the term "Usenet" and enters the query "Usenet groups." In response to this query, the search engine provides a set of search results in which the top-rated search result links to groups.google.com.

While the search engine in the example above eventually finds an informative and high quality resource (i.e., the web page located at the uniform resource locator groups.google.com), the user nevertheless entered a series of queries and selected several search results before finding this resource.

SUMMARY

This specification describes technologies relating to identifying navigational resources for queries. The navigational resources are detected based on common query revisions to navigational queries for the navigational resources.

In general, one aspect of the subject matter described in this specification can be embodied in methods that include the actions of selecting a candidate query in a query sequence stored in a query log, the query sequence including an initial query and one or more revised queries and defining an order in which the queries were submitted for a search session; selecting a revised query subsequent to the candidate query in the order; determining a quality score for the revised query; determining a navigation score for the revised query; and determining that the quality score for the revised query is greater than a quality score threshold and that the navigation score for the revised query is greater than a navigation score threshold, and in response: identifying a navigational resource for the revised query; and associating the navigational resource with the candidate query, the association specifying the navigational resource as being relevant to the candidate query in a search operation. Other embodiments of this aspect include corresponding systems, apparatus, and computer program products.

Another aspect of the subject matter described in this specification can be embodied in methods that include the actions of selecting a candidate query in a query sequence stored in a query log, the query sequence including an initial query and one or more revised queries and defining an order in which the queries were submitted for a search session; selecting a revised query subsequent to the candidate query in the order; determining a quality score for the revised query relative to the candidate query; determining a navigation score for the revised query; and determining that the quality score for the revised query satisfies a quality score threshold and that the navigation score for the revised query satisfies a navigation score threshold, and in response: identifying a navigational resource for the revised query; and associating the navigational resource with the candidate query, the association specifying the navigational resource as being relevant to the candidate query in a search operation. Other embodiments of this aspect include corresponding systems, apparatus, and computer program products.

These and other embodiments can optionally include one or more of the following features. The candidate query is a query that has a navigation score less than a navigation score threshold and that has a quality score less than the quality score threshold.

The candidate query is selected in response to determining that the quality score for the revised query is greater than the quality score threshold and that the navigation score for the revised query is greater than the navigation score threshold.

The revised query is selected in response to determining a quality score for the revised query relative to the candidate query is greater than the quality score threshold and that the navigation score for the revised query is greater than the navigation score threshold.

The query sequence is a collection of queries that were input for the search session within a revision window time period that defines a maximum time period between the input of a query and a subsequent query in a query sequence.

The candidate query is selected only if a probability of revision from the candidate query to the revised query is greater than a probability of entry of the revised query.

The quality score for the revised query is based on resource metrics for each resource identified by a search engine in response to the revised query, the resource metrics for each resource including one or more of an authority score and a search result click-through rate.

The quality score for the revised query is based on revision metrics for the revised query, the revision metrics including one or more of a revision frequency and a revision time.

The query navigation score for the revised query is based on navigational metrics for each resource identified by a search engine in response to the revised query, the navigational metrics including one or more of a cross linkage score, traffic proportion, and click-through rate. The traffic proportion is the proportion of traffic from search results generated in response to the query.

Particular embodiments of the subject matter described in this specification can be implemented to realize one or more of the following advantages. The relevance of navigational resources to a query can be increased based on common query revisions from the query to navigational queries for the navigational resource. The increased relevance can result in a search result identifying the navigational resource being provided as a top-ranked, or highly ranked, search result for a search session with few or no query revisions. The query quality of revised queries can be evaluated relative to candidate queries that are prior to the revised queries so that revised queries that are in fact highly navigational may nevertheless be considered low quality relative to unrelated candidate queries. Accordingly, the likelihood of a navigational resource being associated with an unrelated or irrelevant candidate query is reduced.

The advantages and features listed in the above list are optional and not exhaustive. The advantages and features can be separately realized or realized in various combinations.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1A:
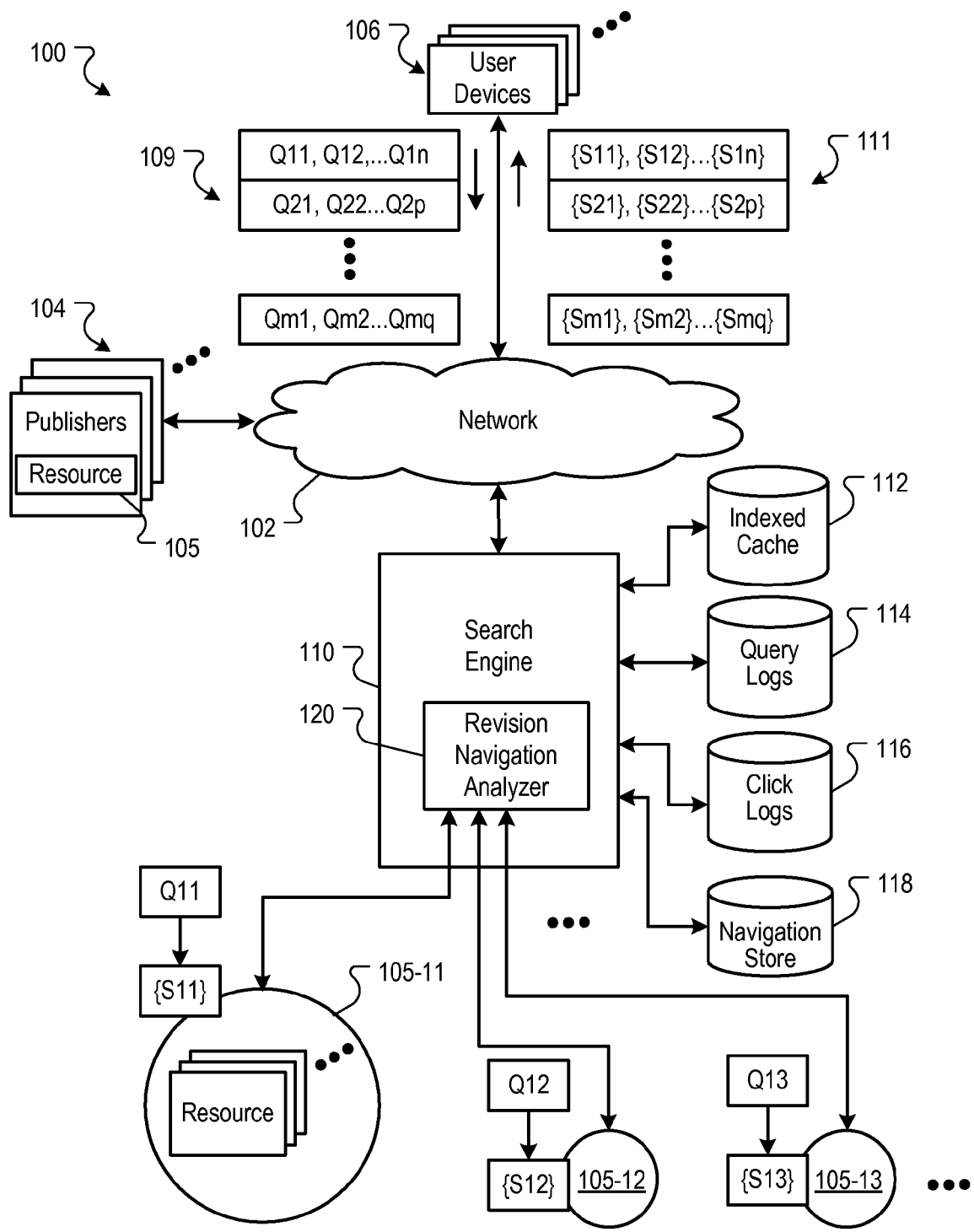
FIG. 1A is a block diagram of an example environment in which a search engine provides search services.

FIG. 1A is a block diagram of an example environment 100 in which a search engine 110 provides search services. A computer network 102, such as a local area network (LAN), wide area network (WAN), the Internet, or a combination thereof, connects publishers 104, user devices 106, and the search engine 110. The online environment 100 may include many thousands of publishers 104 and user devices 106.

A publisher 104 is any web site that hosts and provides electronic access to a resource by use of the network 102. A web site is one or more resources 105 associated with a domain name. An example web site is a collection of web pages formatted in hypertext markup language (HTML) that can contain text, graphic images, multimedia content, and programming elements, such as scripts.

A resource is any data that can be provided by the publisher 104 over the network 102 and that is associated with a resource address. Resources include HTML pages, word processing documents, and portable document format (PDF) documents, images, video, and feed sources, to name just a few. The resources can include content, such as words, phrases, pictures, and so on, and may include embedded information (such as meta information and hyperlinks) and/or embedded instructions (such as JavaScript scripts).

Each resource has an addressable storage location that can be uniquely identified. The addressable location is addressed by a resource locator, such as a universal resource locator (URL).

A user device 106 is an electronic device that is under the control of a user and is capable of requesting and receiving resources over the network 102. Example user devices 106 include personal computers, mobile communication devices, and other devices that can send and receive data over the network 102. A user device 106 typically includes a user application, such as a web browser, to facilitate the sending and receiving of data over the network 102.

As there are many thousands of publishers, there are millions of resources 105 available over the network 102. To facilitate searching of these resources, the search engine 110 identifies the resources by crawling the publishers 104 and indexing the resources provided by the publishers 104. The indexed and, optionally, cached copies of the resources are stored in an indexed cache 112.

The user devices 106 submit search queries 109 to the search engine 110. In response, the search engine 110 uses the indexed cache 112 to identify resources that are relevant to the queries. The search engine 110 identifies the resources in the form of search results 111 and returns the search results 111 to the user devices 106 in search results pages. A search result 111 is data generated by the search engine 110 that identifies a resource that satisfies a particular search query, and includes a resource locator for the resource. An example search result 111 can include a web page title, a snippet of text extracted from the web page, and the URL of the web page.

An exemplary search engine 110 is described in S. Brin and L. Page, "The Anatomy of a Large-Scale Hypertextual Search Engine," Seventh International World Wide Web Conference, Brisbane, Australia (1998) and in U.S. Pat. No. 6,285,999. The search results are ranked based on scores related to the resources identified by the search results, such as information retrieval ("IR") scores, and optionally a separate ranking of each resource relative to other resources ("page rank"). In some implementations, the IR scores are computed from dot products of feature vectors corresponding to a query and a resource, and the ranking of the search results is based on relevance scores that are a combination of the IR scores and page rank scores. The search results 111 are ordered according to these relevance scores and provided to the user device according to the order.

The user devices 106 receive the search results pages and render the pages for presentation to users. In response to the user selecting a search result at a user device 106, the user device 106 requests the resource identified by the resource locator included in the selected search result. The publisher 104 hosting the resource receives the request for the resource from the user device 106 and provides the resource to the requesting user device 106.

Usually a user will submit several or more queries during a search session. For example, a user may be searching for information over a period of time and refining queries, generating a query sequence. There are various ways to identify a search session. In some implementations, a search session can be defined by queries that are each submitted within a revision window time that defines a maximum time period between the input of a query and a subsequent query. For example, if a particular user device 106 submits a query, a current search session is initiated. The current search session terminates when the user does not provide another query within the revision time window. One example revision time window is five minutes. Other time windows can also be used.

In other implementations, the search session can be defined by a user indicating the beginning and end of a search session (e.g., by logging into a search engine interface of the search engine 110 and logging out of a search engine interface). In still other implementations, the search session can be defined by common terms between a newly received search query and previously received search queries from the same user device. Common terms between queries are same terms in a query and a revised query, or the terms of the query and the revised query belonging to a same topic cluster. Other ways of identifying and tracking a search session can also be used.

The queries submitted during the search sessions are stored in query logs 114. In particular, the query logs 114 store sequences of queries for the search sessions. Each query sequence is a sequence of queries including an initial query and one or more revised queries and defines an order in which the queries were submitted for a search session. A revised query is any query in the query sequence that follows one or more prior queries in the sequence. A revised query may be related to a previous query in the query sequence (e.g., may be a query refinement or related to the same topic specified by a previous query in the query sequence), or may be entirely unrelated to a previous query (e.g., may be a query that is unrelated to any topics specified by any previous query in the sequence).

In FIG. 1A, m sequences of queries are shown. Each sequence can vary in size, as illustrated by a first sequence of n queries (Q11, Q12, . . . Q1$n$), a second sequence of p queries, and an m$^{th}$ sequence of q queries. The time that each query was submitted relative to a previously submitted query or selected search result can also be stored in the query logs 114.

Each query in each sequence has an associated corresponding set of search results generated by the search engine 110, and the corresponding set of search results reference a corresponding set of resources. For example, the query Q11 has an associated set of search results {S11}, and each search result references a corresponding resource in a corresponding set of resources 105-11. Likewise, the query Q12 has an associated set of search results {S12}, and so on.

Selection data defining actions taken responsive to search results provided for the search sessions are stored in click logs 116. The actions can include whether a search result was selected, and whether the selection resulted in a long click or a short click. A long click for a resource is defined as a click-through for a resource that results in either subsequent clicks on that resource during the same user session or the same user session persisting on that resource for a predefined time period, e.g., 30 seconds. A short click for a resource is defined as a click-through for a resource that results in either no subsequent clicks on that resource during the same user session or the same user session persisting on that resource for less than the predefined time period, e.g., 30 seconds. Other ways of determining a short click and long click can also be used.

The query logs 114 and click logs 116 can be used to map queries submitted during search sessions to resources that were identified in search results and the actions taken by users. If time data are also stored, then the relative times at which those actions were taken can also be determined.

In some implementations, to protect the privacy of users, the search engine 110 anonymizes search session data for users so that the data stored in the query logs 114 and click logs 116 cannot be associated with the users. For example, each query can be associated with a unique 128-bit number that is not associated with any user. However, if the user opts-in for tracking of the user history data, the search engine 110 can associate search queries and clicks with a user identifier that is uniquely associated with the user. A user can grant permission to the search engine 110 to track the user's history so that historical data for the user's search sessions and other user data are tracked and associated with the user identifier. At the user's option, the search engine 110 can be configured to track only data approved by the user, such as only search queries and search result selections. The user can clear historical data associated with the user account 116 at any time, and can opt-out of such tracking at any time.

Many users of the search engine 110 revise queries in a similar manner, and eventually provide one or more particular queries that identify one or more resource that are often selected by the users. These particular queries are often queries of high quality, as are the corresponding resources identified in response to the queries. Such queries and resources are referred to as "navigational queries" and "navigational resources."

The search engine 110 includes a revision navigation analyzer 120 that analyzes the query logs 114, the click logs 116, and optionally other data to identify navigational resources from navigational queries for association with queries that are not navigational queries based on these common revisions. These navigational resources can be associated with some of these non-navigational queries so that when another user enters one of these non-navigational queries, an associated navigational resource is increased in relevance to the query. In turn, a search result referencing the navigational resource is likewise increased in the search result order. In some implementations, the search result referencing a navigational resource is increased in the search result order so that it is always shown on a first page search results provided for the user session.

A navigational query and a corresponding navigational resource can be identified in a variety of ways. A navigational query, as used in this specification, is a query that has a high quality score and which also has a high navigation score. A quality score is considered high if it exceeds a quality score threshold. Likewise, a navigation score is considered high if it exceeds a navigation score threshold.

In some implementations, a quality score for a query is based on resource metrics of resources identified by a search engine in response to the query. Example resource metrics include a relevance score of resources identified in response to the query, characteristics of the URLs of the resources, and the click-through rate of the resources.

In some implementations, the quality score for the query can be further based on revision metrics. Example revision metrics include a revision type, the time of the revision measured relative to a previously entered query, and the relative frequency at which the query is revised.

In some implementations, the quality score of a revised query is determined relative to a prior query in the query sequence. In other implementations, the quality score of all queries can be determined independent of each other.

The generation of the quality score is described in more detail with reference to FIG. 6 below.

In some implementations, a navigation score for a query is based on navigation metrics of resources identified by a search engine in response to the query. Example navigation metrics include cross linkage of resources referenced by the search results responsive to the query, the click-through rates of the search results, the proportion of search result selection traffic to particular resources referenced by the search results, and other metrics. The generation of the navigation score is described in more detail with reference to FIG. 7 below.

Figure 1B:
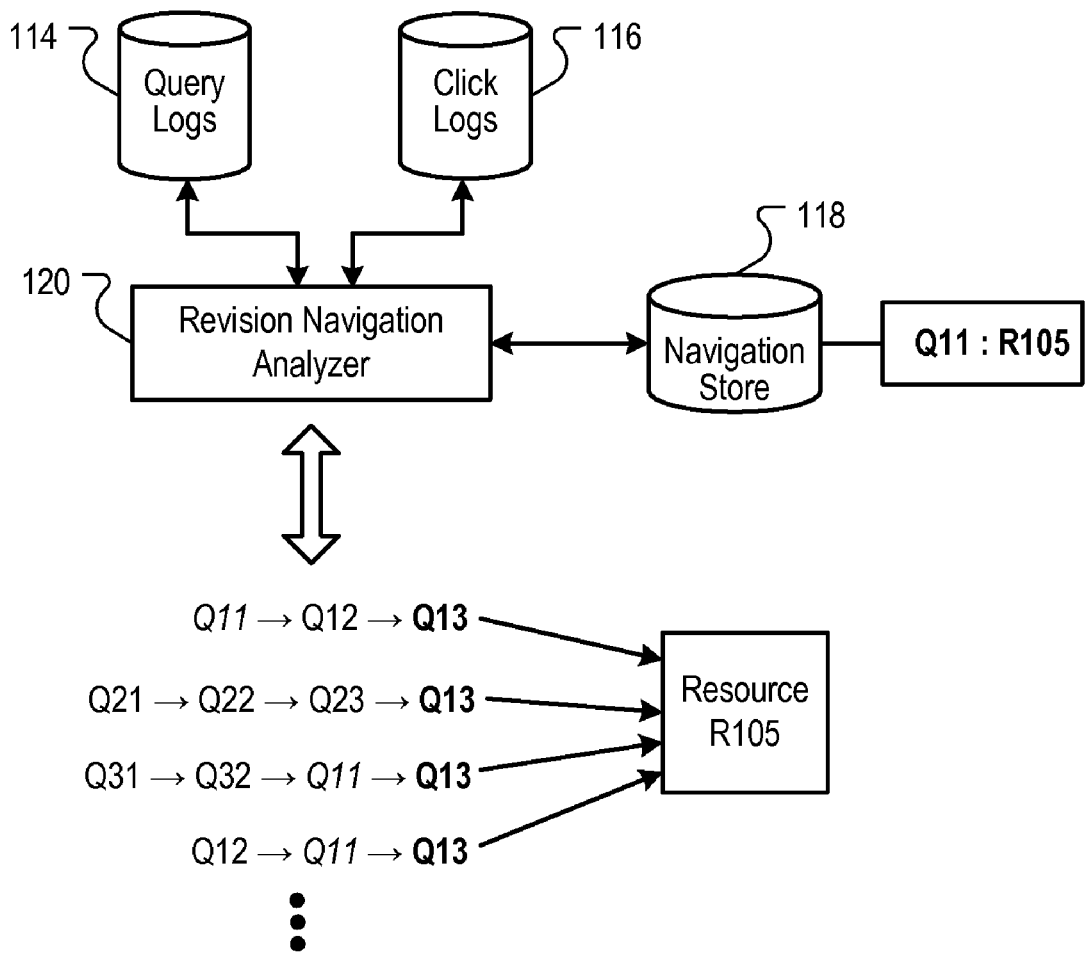
FIG. 1B is a block diagram illustrating an example processing of query sequences to identify a navigational resource for a query.

FIG. 1B is a block diagram illustrating an example processing of query sequences to identify a navigational resource for a query. Shown in FIG. 1B are query sequences stored in the query logs 114 for multiple search sessions. Each of these search sessions included a revised query, Q13, for which a search result referencing a resource R105 was often selected.

For each query, a quality score and a navigation score is determined, and the queries in each query sequence are processed based on the quality score and navigation score. For each sequence, if a query has a quality score that is less than the quality score threshold, and has a navigation score that is less than a navigation score threshold, the query is considered to be a candidate query that is eligible for association with a navigational resource. For example, in FIG. 1B, the query Q11 is identified as a candidate query.

A revised query that is subsequent to the candidate query in the sequence is selected and the quality score and the navigation score of the revised query are compared to the quality score threshold and the navigation score threshold, respectively. If the revised query has a quality score that exceeds the quality score threshold, and has a navigation score that exceeds the navigation score threshold, then the revised query is identified as a navigational query. For example, in FIG. 1B, the query Q13 is identified as a navigational query.

A navigational resource for the navigational query is then identified and associated with the candidate query. The association specifies the navigational resources being relevant to the candidate query for a search operation. As shown in FIG. 1B, the query Q11 is associated with the navigational resource R105.

The association is stored in the navigation store 118. Thereafter, in response to the search engine 110 receiving an input query for the search operation, the input query is compared to the query stored in the navigation store 118. If the input query matches the query stored in the navigation store 118, the relevance score of the navigation resource associated with the matching input query is increased so that a search result referencing the navigational resource is highly ranked in an ordered set of search results responsive to the input query.

In some implementations, search engine 110 accesses the navigation store 118 and incorporates the associations of navigational resources into a search algorithm. In other implementations, the search engine 110 does not take into account the associations of navigational resources when generating search results, and provides the search results to the revision navigation analyzer 120. The revision navigation analyzer 120, in turn, adjusts the relevance score of the navigational resource so that the corresponding search result is boosted in rank. In some implementations, the boosting of the search result can be limited to a particular position, e.g., no higher than fourth from a top ranked search result.

Figure 2A:
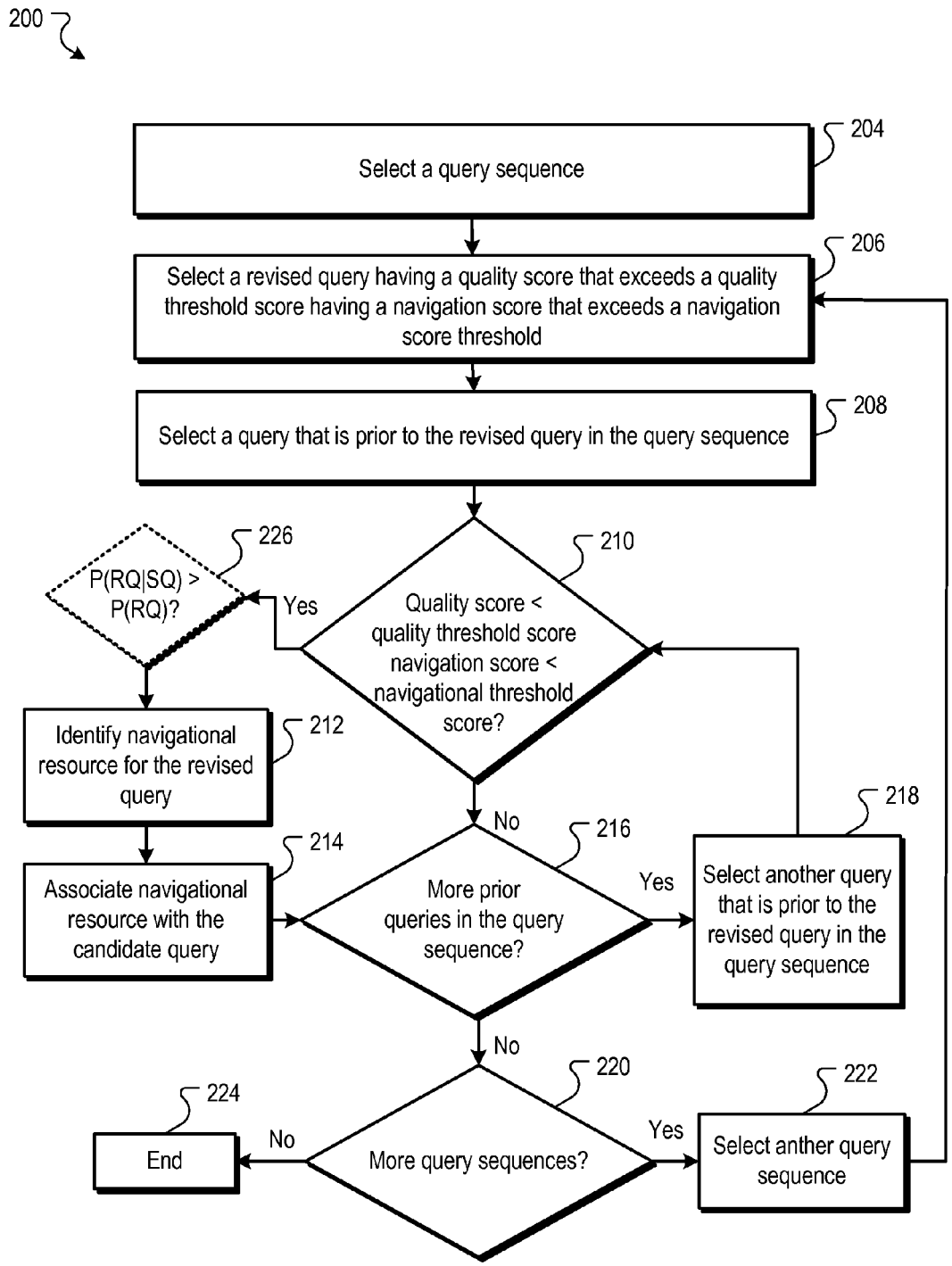
FIG. 2A is a flow diagram of an example process for associating a navigational resource with a query.

FIG. 2A is a flow diagram of an example process 200 for associating a navigational resource with a query. The example process 200 can be used in the revision navigation analyzer 120.

A query sequence is selected (204), and a revised query having a quality score that exceeds a quality score threshold and having a navigation score that exceeds a navigation score threshold is selected (206).

A query that is prior to the revised query in the query sequence is selected (208). A query is prior to the revised query in the query sequence if the query was entered in the query sequence before the revised query was entered in the query sequence. For example, in the sequence of four queries entered for search session, if the fourth query is the revised query, then the first, second, and third queries are prior to the revised query.

The query is evaluated on the quality score and navigation score (210). If the quality score is less than the quality score threshold, and the navigation score is less than navigation score threshold, then the query is determined to be a candidate query. In response, a navigational resource for the revised query is identified (212), and the navigational resource is associated with the candidate query (214).

After associating the navigational resource with the candidate query, or if either the quality score or the navigation score of the selected query is a high score, the query sequence is checked to determine if there are additional prior queries (216).

If there are additional prior queries, then another query that is prior to the revised query in the query sequence is selected (218). The newly selected query is then evaluated and processed as described above.

If there are no additional prior queries in the sequence, the query sequences are checked to determine if there are additional query sequences to be processed (220). If there are additional sequences to be processed, the next query sequence is selected (222) and evaluated and processed as described above. Otherwise the process 200 ends (224).

In some implementations, a selected query is further determined to be a candidate query only if a probability of revision from the selected query to the revised query is greater than a probability of entry of the revised query. In some implementations, this condition is evaluated based on a conditional probability of the revised query being entered in a query sequence given that the candidate query is present in the query sequence being greater than the probability of the revised query being entered (226). The probability of the revised query being entered is the probability that the revised query is entered for any query input. In some implementations, this probability is calculated by dividing the number of times the revised query occurs in the query logs 114 by the total number of queries in the query logs 114. The probability of revision from the selected query to the revised query can be calculated from the probability of the revised query and the selected query occurring in the same query sequence divided by the probability of entering of the selected query, i.e., $$P(RQ|SQ) = P(RQ \cap SQ)/(P(SQ)) \quad$$

Where:
RQ=revised query; and
SQ=selected query.

The probability of revision from the selected query to the revised query being greater than a probability of entry of the revised query is a signal that the revised query is related to the selected query. For example, consider the following two query sequences 1 and 2:

user discussions→{0 or more queries}→Usenet groups (1)

sages circumventing Zeus→{0 or more queries}→Usenet groups (2)

Assume that the probability of entry of the query "Usenet groups" is 0.0020%. Assume also that the probability of revision to the query "Usenet Groups" in a query sequence in which the query "user discussions" was entered is 0.0080%, and that the probability of revision to the query "Usenet groups" in query sequence in which the query "sages circumventing Zeus" was entered is 0.0018%. Because the probability of revision to the query "Usenet Groups" in a query sequence in which the query "user discussions" was entered is higher than the probability of entry of the query "Usenet groups", the queries "Usenet groups" and "user discussions" can be considered to be related queries.

Conversely, because the probability of revision to the query "Usenet Groups" in a query sequence in which the query "sages circumventing Zeus" was entered is less than the probability of entry of the query "Usenet groups," the queries are considered to be unrelated queries. Such unrelated queries may occur when users are not searching on any subject in particular. Accordingly, it would not be useful to associate a navigational resource of the query "Usenet groups" (e.g., groups.google.com) with the query "sages circumventing Zeus."

Although the probability determination is described as a separate evaluation step, in some implementations, the probability determination can be integrated into the process of determining a quality score for the revised query. For example, as the probability of revision from the selected query to the revised query relative to the probability of entry of the revised query increases, the quality score of the revised query can also increase.

The order of steps in the example process 200 described above is illustrative only, and processing of queries and query sequences can be done in different orders. For example, while the process 200 above describes first identifying a revised query having a quality score that exceeds a quality score threshold and having a navigation score that exceeds a navigation score threshold, and then identifying candidate queries that are prior to the revised query in the query sequence, the process 200 can be modified so that candidate queries are first identified and then revised queries that are of high quality and navigational are identified.

In some implementations, the query quality score of the revised query can be determined relative to a selected candidate query. Determining the query quality score of a revised query relative to the candidate query reduces the likelihood that navigational resources that are unrelated to the candidate query are associated with the candidate query. For example, with respect to FIG. 1B, the query Q11 may be strongly related to the query Q13 (e.g., have common non-stop word terms with the query Q13); however, the query Q12 may be poorly related to the query Q13 (e.g., have entirely different words that are not synonyms for any of the words in the query Q13). As such, the query quality score for the query Q13 will be high relative to query Q11, but will be low relative to the query Q12.

By evaluating the query quality of revised queries relative to candidate queries that are prior to the revised queries, revised queries that are in fact highly navigational may nevertheless be considered low quality relative to unrelated candidate queries. Accordingly, the likelihood of a navigational resource being associated with an unrelated or irrelevant candidate query is reduced.

Figure 2B:
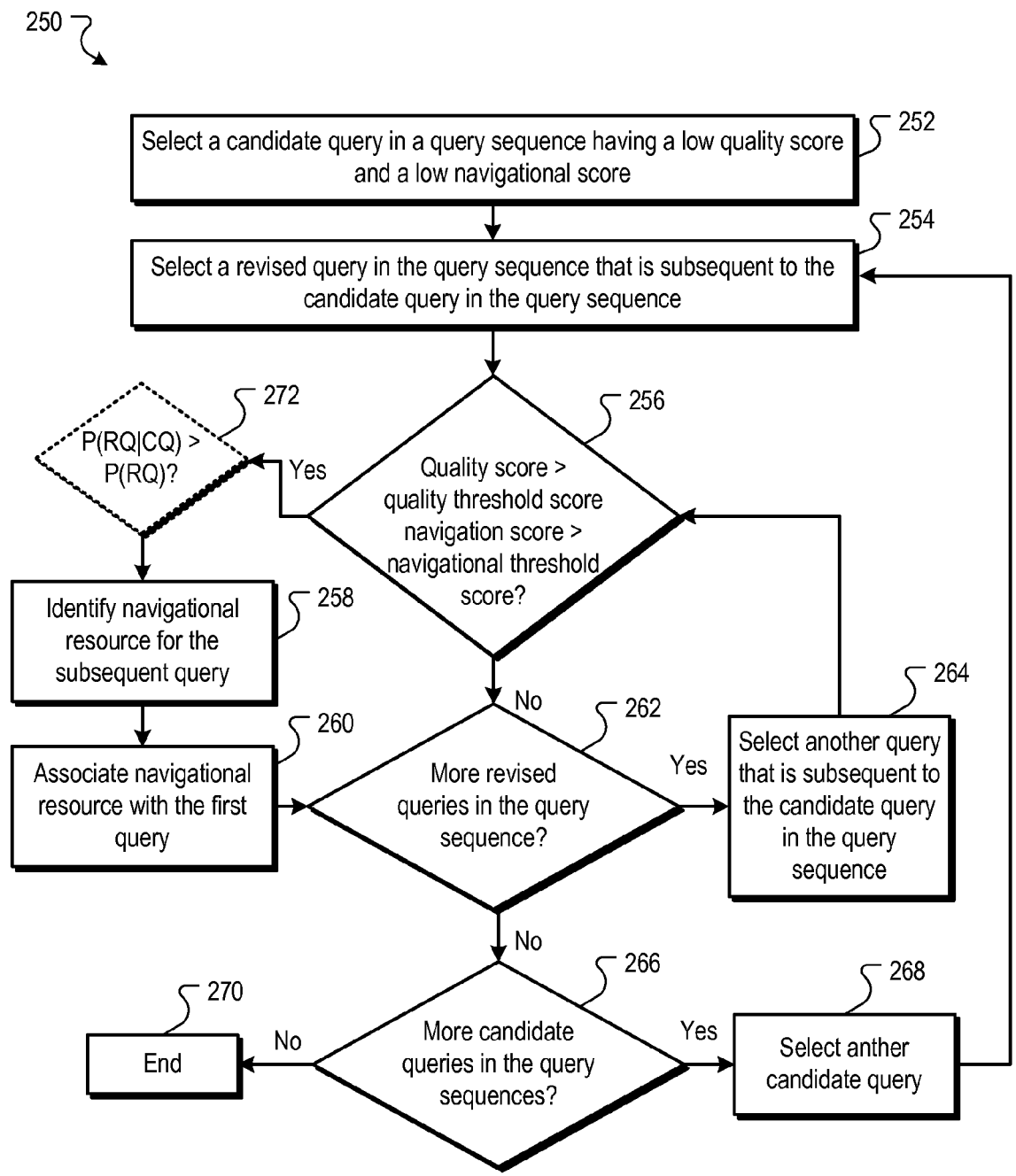
FIG. 2B is a flow diagram of another example process for associating a navigational resource with a query.

An example of such a process is shown in FIG. 2B, which is a flow diagram of another example process 250 for associating a navigational resource with a query. The example process 200 can be used in the revision navigation analyzer 120.

A candidate query having a quality score that is less than the quality score threshold and having a navigation score that is less than the navigation score threshold is selected (252).

A revised query that is subsequent to the candidate query in a query sequence is selected (254), and the quality score and the navigational score of the revised query is determined. The process 250 determines the query quality score of the revised query relative to the candidate query.

The revised query is evaluated on the quality score and navigation score (256). If the quality score is greater than the quality score threshold, and the navigation score is greater than the navigation score threshold, then the revised query is determined to be a navigational query for the candidate query. In response, a navigational resource for the revised query is identified (258), and the navigational resource is associated with the candidate query (260).

After associating the navigational resource with the candidate query, or if either the quality score or the navigation score of the revised query is not a high score, the query sequence is checked to determine if there are additional revised queries (262).

If there are additional revised queries, then another revised query that is subsequent to the candidate query in the query sequence is selected (264). The newly selected revised query is then evaluated and processed as described above.

If there are no more revised queries, then the query sequence is checked for another candidate query (266). If there is another candidate query, the candidate query is selected (270). The newly selected revised query is then evaluated and processed as described above.

If there are no additional candidate queries in the sequence, the process 250 ends for that query sequence (270).

In some implementations, a navigational resource for the revised query is selected only if a probability of revision from the candidate query to the revised query is greater than a probability of entry of the revised query (272).

Figure 3:
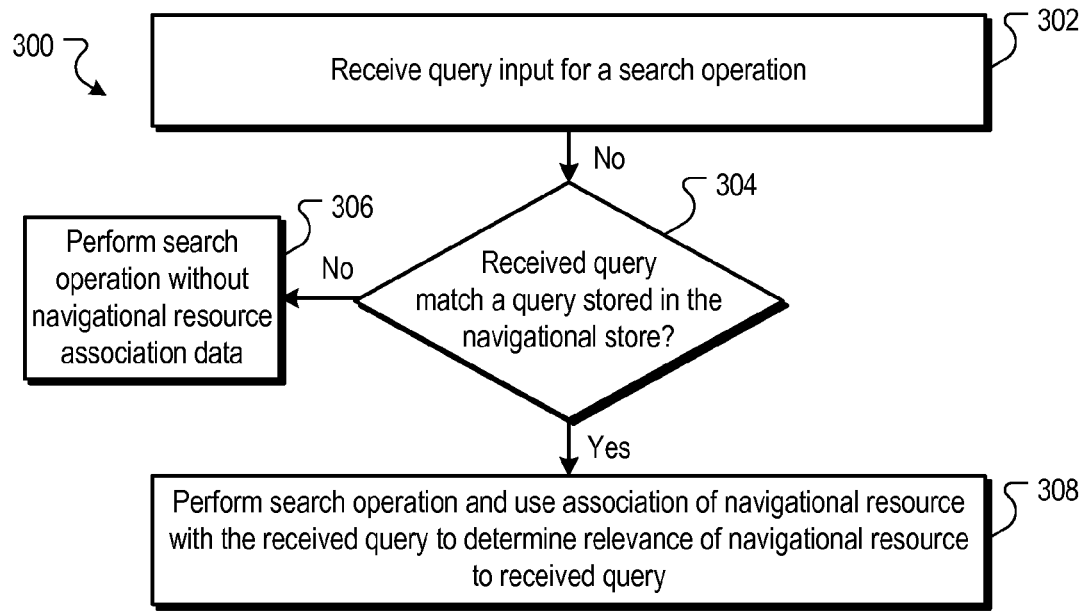
FIG. 3 is a flow diagram of an example process for using the association of the navigational resource with a query for a search operation.

FIG. 3 is a flow diagram of an example 300 process for using the association of the navigational resource with a query for a search operation. The example process 300 can be used in a search engine 110 to generate relevance scores for resources in response to receiving search queries.

A query input for search operation is received (302), and the received query is evaluated to determine if it matches a query stored in the navigation store (304). In some implementations, the received query is determined to match a query stored in the navigation store if the received query exactly matches a query stored in the navigation store. In other implementations, the received query is determined to match a query stored in the navigation store if the received query is within an edit distance of a query stored in the navigation store. For example, a plural noun term can be considered to match a corresponding singular noun term that is spelled differently. Matches can also be based on other language and editing conditions, such as common misspellings, synonyms, the presence of a common term between revisions, and edit distances, to name just a few.

If the received query does not match a query stored in the navigation store, then the search operation is performed without use of the navigational resource data (306). For example, the search operation can use any number of known search algorithms to generate relevance scores that measure the relevance of resources to the search query, and the search operation can be performed without considering the association of navigational resources with the received query (306).

If the received query does match a query stored in the navigation store, then the search operation is performed using the association of the navigational resource with the received query, as well as other data, to determine the relevance of the navigational resource to the received query (308).

Figure 4:
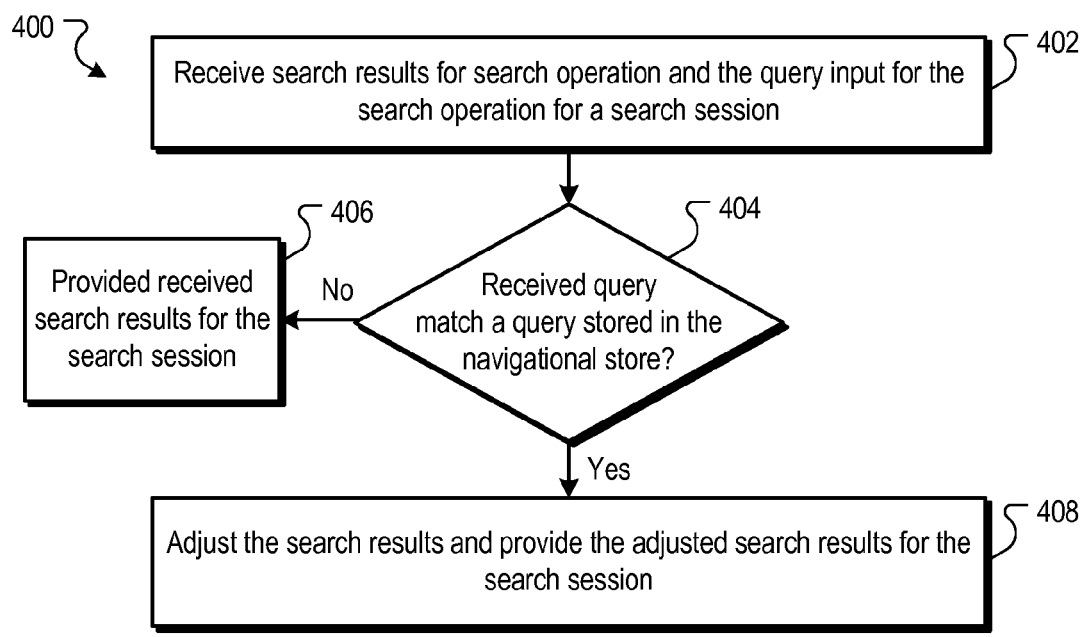
FIG. 4 is a flow diagram of an example process for using the association of the navigational resource with a query for adjusting search results responsive to the query.

FIG. 4 is a flow diagram of an example process 400 for using the association of the navigational resource with a query for adjusting search results responsive to the query. The example process 400 can be used in the search engine 110, in the revision navigation analyzer 120, or in other systems that can receive search results from the search engine 110 and adjust the ordering of the search results.

Search results for a search operation and the query input for the search operation are received (402). For example, the search engine 110 can provide the revision navigation analyzer 120 a query input for search operation and the search results generated in response. The search results are responsive to a search query and are ranked according to a first order, and each search result includes a corresponding resource locator that specifies the location of a corresponding resource.

The received query is evaluated to determine if it matches a query stored in the navigation store (404). A match between a received query and a query stored in the navigation store 118 can be determined as described above.

If the received query does not match a query stored in the navigation store, then the received search results are provided for the search session (406). For example, the search results can be provided to a user device according to the first order.

If the received query does match a query stored in the navigation store, then the received search results are adjusted and provided for the search session (408). The revision navigation analyzer 120 can identify a search result that references the navigational resource and adjust the rank of the search result so that the search results are ordered according to a second order.

In some implementations, the revision navigation analyzer 120 adjusts the rank of the search result so that the search result is positioned a predetermined number of positions below a top ranked search result, e.g., no higher than fourth in the second order. In some implementations, the revision navigation analyzer 120 adjusts the actual relevance score associated with the search result so that the search result is promoted to a predefined position in the second order, e.g., fourth from the top. For example, the relevance scores associated with the third search result and the fourth search result in the first order can be compared to the relevance score of the search result that is to be promoted to the fourth position. The relevance score of the search result that is to be promoted can then be adjusted so that it is greater than the relevance score of the fourth search result in the first order and less than the relevance score of the third search result in the first order. Other processes to promote search results to particular positions can also be used.

Limiting the adjustment of the search result in the order can be done in case the user intentionally inputs an informational query and does not want a navigational result. An informational query is a query that can have few or many highly relevant results. Many users are familiar with certain navigational queries for certain topics and resources; however, these users may often input broad informational queries when their intention is to find varied resources related to a topic.

Figure 5:
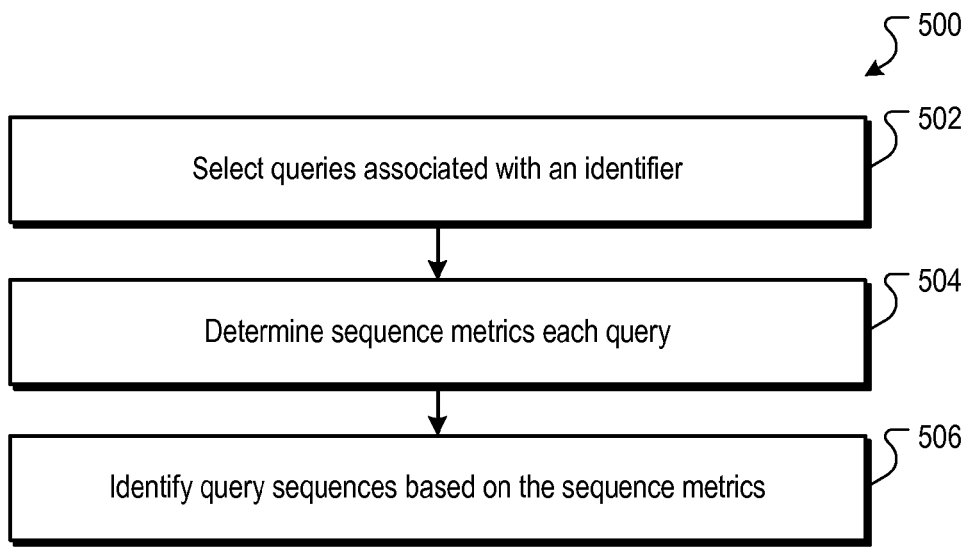
FIG. 5 is a flow diagram of an example process for identifying query sequences.

FIG. 5 is a flow diagram of an example process 500 for identifying query sequences from search sessions. The example process 500 can be used in the revision navigation analyzer 120.

Queries associated with an identifier are selected (502). For example, query stored in the query log 114 can be grouped according to associated identifiers. The identifiers can, for example, be user identifiers that identify particular user accounts; or can be anonymized identifiers that do not identify a user or a user account. An example of an anonymized identifier is an identifier that is associated with a search toolbar browser plug-in. The search toolbar browser plug-in can be configured to generate a new identifier each time the browser is launched, or can be configured to generate a new identifier periodically, such as once every month. Each time a search query is submitted to the search engine 110 using the search toolbar browser plug-in, the corresponding identifier is provided with the query and stored with the query in the query logs 114.

Sequence metrics for each query are determined (504). A user may input many different queries to the search engine 110, and thus there can be many queries associated with a user identifier. These many queries may constitute a single query sequence, or may constitute two or more different query sequences. Thus, the revision navigation analyzer 120 measures one or more sequence metrics of the queries to identify query sequences. Example sequence metrics include revision times that measure the time a query was input relative to a previously input query; similarity of the revised query to a previously input query; an overall sequence time window that measures the time period between the input of a first query in the sequence and the input of the last query sequence; and the number of queries in a sequence.

Query sequences based on the sequence metrics are identified (506). For example, a query sequence may be defined as queries that are each submitted within a revision window time measured from the time of a previously input query. Thus, if a particular user device 106 submits a query, a query sequence is started. The query sequence terminates when the user does not provide another query within the revision time window. One example revision time window is five minutes. Other time windows can also be used.

The query sequences may be further defined by queries that are similar queries. For example, a minimum edit distance or common term between a query and a subsequent query may be required for the two queries to be considered part of the same query sequence.

The query sequences may be further defined by an overall sequence time window and by a maximum number of queries in the sequence. For example, the query sequence can be limited to queries that were input to the search engine within a two-hour period; or maximum number of queries, such as 20.

Figure 6:
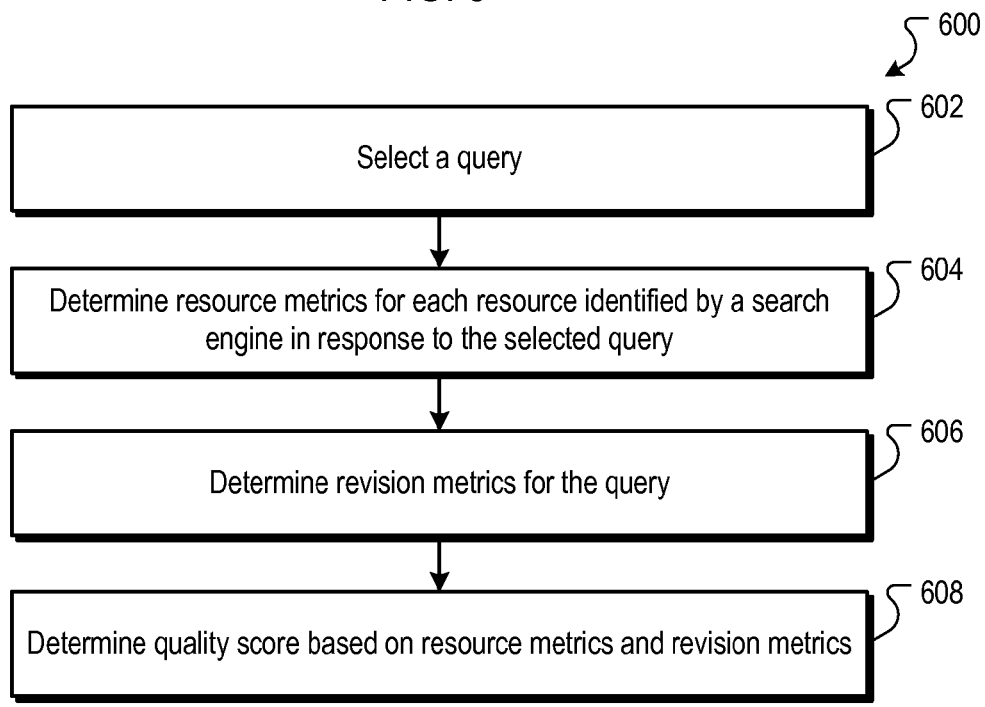
FIG. 6 is a flow diagram of an example process for determining a quality score for a query.

FIG. 6 is a flow diagram of an example process 600 for determining a quality score for a query. The example process 600 can be used in the revision navigation analyzer 120.

A query is selected (602), and resource metrics for each resource identified by a search engine in response to the selected query are determined (604). Example resource metrics include a relevance score of resources identified in response to the query, characteristics of the URLs of the resources, the click-through rate of search results generated in response to the query, and user feedback indicating a like or dislike of the resources identified in response to the query.

The relevance scores of the resources for the query can include the rank score of the resources relative to other resources. Example rank scores include authority scores generated by link graph analysis algorithms that assign a numerical weight to nodes representative of resources in a hyperlinked set of resources.

The relevance scores can be further based on the relevance of each resource to the query. The relevance of a resource to a query can be based on one or more information retrieval metrics, such as precision, recall, term frequency-inverse document frequency metrics, and dot products of feature vectors.

The characteristics of the URLs of the resources can include the length of the URLs and the directory depth of the URL. For example, URLs having very long names or having very deep directory depths within a host will tend to decrease the quality score of the query. Conversely, top-level URLs having short names will tend to increase the quality score of the query.

The click-through rate of search results generated in response to the query can be a central tendency (e.g., average or median) of click-through rates of all search results generated in response to the query. Other measures based on click-through rates can also be used.

Revision metrics for the query are determined (606). In some implementations, the quality score for the query can be further based on revision metrics. Example revision metrics include a revision type, a revision time measured relative to a previously entered query, and the relative frequency at which the query is revised. This latter metric can be determined by considering all revisions of the query in the query logs 114.

A revision type specifies a type of revision. Example revision types include operator changes (e.g., changing an AND operator to an OR operator, adding or deleting a root expander); noun changes (e.g., changing from singular to plural); a synonym change (e.g., change one term for a synonym term); and a term degree change (e.g., the number of terms changed in a multi-term query), to name just a few. The revision types can specify a degree of relatedness, and a high degree of relatedness between a previous query and a revised query will tend to increase the quality score of the revised query. For example, a synonym change results in a higher quality score for the revised query, and a high degree term change that is not a synonym change results in a lower quality score for the revised query.

Revision types can be determined for any two queries in a query sequence, and is not limited to a revised query and the query that is immediately prior to the revised query in the query sequence. For example, with respect to the first sequence of FIG. 1B (Q11→Q12→Q13), revision types can be determined for revisions defined by the differences between the queries Q13 and Q11, and for the revisions defined by the differences between the queries Q13 and Q12.

The revision time of a revised query measured relative to a previously entered query can also be used to adjust the quality score of a revised query. As with the revision type, the revision time can be determined for any two queries in a query sequence, and is not limited to a revised query and the query that is immediately prior to the revised query in the query sequence. For example, with respect to the first sequence of FIG. 1B (Q11→Q12→Q13), a revision time between Q13 and Q11 may be 90 seconds, and a revision time between Q13 and Q12 may be five seconds.

In some implementations, the quality score of a revised query relative to a prior query tends to increase as the revision time decreases. This relation is based on the assumption that two queries having a short revision time are more related than two queries having a longer revision time. In some implementations, the quality score of a revised query can decrease based on a function of the revision time. Various linear and non-linear functions can be used, such as exponential functions, logarithmic functions, and stepped functions.

The quality score for the selected query is determined based on the resource metrics and the revision metrics (608). The quality score can be based on the resource metrics, or the revision metrics, or a combination of the resource metrics and the revision metrics. For example, the following function can be used to generate the quality score:

$$QS = f1(f2(\text{resource metrics}), f3(\text{revision metrics}))$$

The function f1 returns a quality score based on the score components generated by the functions f2 and f3. In some implementations, the function f1 is a summation of the score components of f2 and f3. In other implementations, the score components of f2 and f3 can be weighted. In other implementations, the output of the function f1 can be the product of the score components of f2 and f3. Other functions for f1 can also be used, and more or fewer score components can be used.

Each of the functions f2 and f3, in turn, respectively uses one or more of the resource metrics and revision metrics as input. Each of the functions f2 and f3 can generate a score component using a linear or non-linear function that uses the corresponding resource and revision metrics as input.

Other resource and revision metrics can also be used when determining query quality. Such metrics include the frequency at which the query is entered and the amount of traffic for each resource. A lower frequency of entry will tend to reduce a query quality score for a query. In some implementations, queries that are infrequently entered (e.g., less than 0.00001% of all queries entered) are automatically considered low quality queries.

Another metric includes the amount of traffic to the resources. Resources that receive little or no traffic tend to lower the quality score of a corresponding query, and resources that have a large amount of traffic tend to raise the quality score of a corresponding query.

In some implementations, the quality score of all queries can be determined independent of each other. For example, revision times and revision types can be ignored. In other implementations, the quality score of candidate queries can be determined independent of other queries, while the quality scores of revised queries are determined relative to candidate queries.

In some implementations, the quality score is the output of a machine-learned model that is trained using training and testing data. The training data and testing data are queries and related resources of varying quality as determined by human evaluators. The machine-learned model can use one of many known linear or non-linear regression models. For example, a feature set corresponding to the resource metrics and revision metrics can be defined for training the machine-learned model on the training data. Once the model is trained with a corresponding set of feature weights, the model is tested on the testing data. The training and testing process continues until the model estimates the quality of the queries in the testing set to an acceptable degree of accuracy. In other implementations, the quality score is output by a model in which the feature weights are established by evaluators and not established by a machine-learning process.

The quality score threshold can be set based on the output of the machine-learned model. For example, if the quality score is a value that ranges from 0 to 1, the quality score threshold can be set to 0.7.

Figure 7:
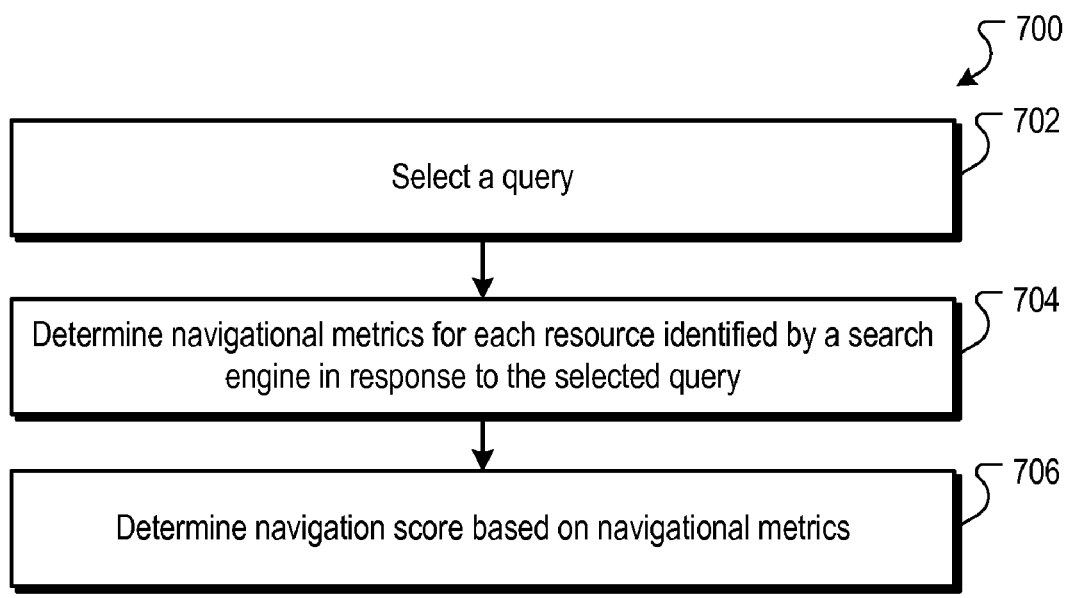
FIG. 7 is a flow diagram of an example process for determining a navigation score for a query.

FIG. 7 is a flow diagram of an example process 700 for determining a navigation score for a query. The example process 700 can be used in the revision navigation analyzer 120.

A query is selected (702), and navigational metrics for each resource identified by a search engine in response to the selected query are determined (704). Example navigation metrics include cross linkage of resources referenced by the search results responsive to the query, the rank score of the resources identified by the query, the click-through rates of the search results, the proportion of traffic generated by search to particular resources referenced by the search results, and other metrics.

A high cross-linkage of documents referenced by the search results can be indicative of a navigational query, and will tend to increase the navigation score of the query. For example, many resources identified in response to a search query may include links to one particular resource, i.e., a navigational resource.

The rank score of the resources relative to other resources can also be indicative of a navigational resource. For example, a set resources determined to be relevant to the query may include only a small number of resources that have high rank scores relative to other resources in the set. These resources with high rank scores may be navigational resources. Accordingly, such a rank score distribution will tend to increase the navigation score of the query. Conversely, a uniform rank score distribution will tend to decrease the navigation score of the query.

Metrics related to the click-through rate of search results that reference a resource and/or the proportion of traffic that the resource receives from all traffic generated from sets of search results that included a search result that reference the resource can also be considered in determining the navigation score for the query. For example, the navigation score for the query will tend to increase if there are resources that have a high click-through rate and/or receive a high percentage of traffic generated from search results identified in response to the query.

The navigation score for the selected query is determined based on the navigation metrics (608). The navigation score can be generated by a function that uses the navigational metrics as input. The function can be a linear or non-linear function.

In some implementations, the navigation score is the output of a machine-learned model that is trained using training and testing data. The training data and testing data are navigational queries and non-navigational queries as determined by human evaluators, and the related resources that are identified by the use of the navigational and non-navigational queries. The machine-learned model can use one of many known linear or non-linear regression models. For example, a feature set corresponding to the navigational metrics can be defined for training the machine-learned model on the training data. Once the model is trained with a corresponding set of feature weights, the model is tested on the testing data. The training and testing process continues until the model estimates the navigational scores of the queries in the testing set to an acceptable degree of accuracy. In other implementations, the quality score is output by a model in which the feature weights are established by evaluators and not established by a machine-learning process.

The navigation score threshold can be set based on the output of the machine-learned model. For example, if the navigation score output is a value that ranges from 0 to 1, the quality score threshold can be set to 0.7.

Queries that have a navigation score that exceeds the navigation score threshold are also used to identify corresponding navigational resources. The navigational resource for a query are identified based on the navigation metrics. For example, a navigational resource can be a resource for which a click-through rate of search results generated in response to a query and referencing the resource exceeds a click-through rate threshold, e.g., 25%. Alternatively, a navigational resource can be a resource for which a proportion of traffic directed to the resource in sets of search results that include a search result that references the resource exceeds a traffic proportion threshold, e.g., 40%.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a tangible program carrier for execution by, or to control the operation of, data processing apparatus. The tangible program carrier can be computer-readable medium, such as a machine-readable storage device, a machine-readable storage substrate, a memory device, or a combination of one or more of them.

The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

What is claimed is:

1. A computer-implemented method, comprising:
   selecting a candidate query in a query sequence stored in a query log, the query sequence including an initial query and one or more revised queries and defining an order in which the queries were submitted for a search session;
   selecting a revised query subsequent to the candidate query in the order;
   determining a quality score for the revised query;
   determining a navigation score for the revised query; and
   determining that the quality score for the revised query is greater than a quality score threshold and that the navigation score for the revised query is greater than a navigation score threshold, and in response:
   identifying a navigational resource for the revised query; and
   associating the navigational resource with the candidate query, the association specifying the navigational resource as being relevant to the candidate query in a search operation.

2. The computer-implemented method of claim 1, wherein selecting the candidate query in the query sequence comprises selecting a query that has a navigation score less than the navigation score threshold and that has a quality score less than the quality score threshold.

3. The computer-implemented method of claim 2, wherein the query sequence is a collection of queries that were input for the search session within a revision window time period that defines a maximum time period between the input of a query and a subsequent query in a query sequence.

4. The computer-implemented method of claim 1, wherein selecting the query sequence for a search session comprises selecting a query sequence in which the initial query and subsequent queries belong to a same topic cluster.

5. The computer-implemented method of claim 1, wherein the candidate query is further selected in response to determining that the quality score for the revised query is greater than the quality score threshold and that the navigation score for the revised query is greater than the navigation score threshold.

6. The computer-implemented method of claim 5, wherein selecting the candidate query comprises:
   selecting a query that is prior to the revised query in the query sequence;
   determining a quality score for the selected query;
   determining a navigation score for the selected query; and
   determining the selected query is a candidate query if the quality score of the selected query is less than the quality score threshold and the navigation score of the selected query is less than the navigation score threshold.

7. The computer-implemented method of claim 5, wherein the selected query is further determined to be a candidate query only if a probability of revision from the selected query to the revised query to is greater than a probability of entry of the revised query.

8. The computer-implemented method of claim 1, wherein determining a quality score for the revised query comprises:
   determining resource metrics for each resource identified by a search engine in response to the revised query, the resource metrics including one or more of an authority score and a search result click-through rate; and
   determining revision metrics for the revised query, the revision metrics including one or more of a revision frequency and a revision time;
   wherein:
   the authority score is a score of a node in a link graph and that is representative of the resource;
   the revision frequency is frequency at which the revised query is further revised in search sessions;
   the revision time is a time measured relative to the entry of the candidate query; and
   the click-through rate is a rate at which one or more search results for the revised query in response to the search operation are selected.

9. The computer-implemented method of claim 1, wherein determining a navigation score for the revised query comprises determining navigational metrics for each resource identified by a search engine in response to the revised query, the navigational metrics including one or more of a cross linkage score, traffic proportion, and click-through rate.

10. The computer-implemented method of claim 1, wherein determining a navigation score for the revised query comprises:
   determining a traffic proportion for each resource identified by a search engine in response to the revised query, the traffic proportion being a proportion of traffic from search results generated in response to the query; and
   the navigation score threshold is a traffic proportion threshold.

11. The computer-implemented method of claim 10, wherein identifying the navigational resource for the revised query comprises identifying as the navigational resource a resource having a traffic proportion that exceeds the traffic proportion threshold.

12. The computer-implemented method of claim 1, wherein determining a navigation score for the revised query comprises:
   determining a click-through rate for each resource identified by a search engine in response to the revised query, the click-through rate being a rate at which search results generated in response to the query and referencing the resource were selected; and
   wherein the navigation score threshold is a click-through rate threshold.

13. The computer-implemented method of claim 12, wherein identifying the navigational resource for the revised query comprises identifying as the navigational resource the resource having a click-through rate that exceeds the click-through rate threshold.

14. The computer-implemented method of claim 1, wherein the search operation, responsive to receiving an input query, generates a corresponding relevance score for each of a plurality of resources, each relevance score measuring a relevance of the resource to the input query, and further comprising:
   receiving from a search session an input query for the search operation;
   determining that the input query matches the candidate query and in response increasing the relevance score of the navigational resource associated with the candidate query;
   generating a set of search results, each search result including a corresponding resource locator that specifies the location of a corresponding resource, at least one of the corresponding resources being the navigational resource;
   ordering the search results according to the relevance scores of the corresponding resources; and
   providing the search results for the search session.

15. The computer-implemented method of claim 1, wherein the search operation, responsive to receiving an input query, generates a set search results responsive to the input query, each search result including a corresponding resource locator that specifies the location of a corresponding resource and ranked according to a first order, and further comprising:
   receiving from a search session an input query for the search operation;
   determining that the input query matches the candidate query and determining that one of the search results includes a corresponding resource locator referencing the navigational resource, and in response increasing the rank of the search result that includes the resource locator referencing the navigational resource to rank the search results according to a second order; and
   providing the set of search results ranked according to the second order for the search session.

16. The computer-implemented method of claim 1, wherein determining a quality score for the revised query comprises determining a quality score for the revised query relative to the candidate query.

17. A system, comprising:
   a data processing apparatus having accesses to a data store storing:
      a query log storing query sequences for search sessions, each query sequence being a sequence including an initial query and one or more revised queries and defining an order in which the queries were submitted for a search session; and
      a click log storing selection data defining actions taken responsive to search results provided for the search sessions, the search results provided in response to the queries and each search result including a corresponding resource locator that specifies the location of a corresponding resource;
   a computer-readable medium storing instructions executable by the data processing apparatus and upon such execution cause the data processing apparatus to perform operations comprising:
   selecting a candidate query in a query sequence;
   selecting a revised query subsequent to the candidate query in the order;
   determining a quality score for the revised query;
   determining a navigation score for the revised query; and
   determining that the quality score for the revised query is greater than a quality score threshold and that the navigation score for the revised query is greater than a navigation score threshold, and in response:
      identifying a navigational resource for the revised query; and
      associating the navigational resource with the candidate query, the association specifying the navigational resource as being relevant to the candidate query in a search operation.

18. The system of claim 17, wherein selecting the candidate query in the query sequence comprises selecting a query that has a navigation score less than the navigation score threshold and that has a quality score less than the quality score threshold.

19. The system of claim 17, wherein the candidate query is further selected in response to determining that the quality score for the revised query is greater than the quality score threshold and that the navigation score for the revised query is greater than the navigation score threshold, and selecting the candidate query comprises:
   selecting a query that is prior to the revised query in the query sequence;
   determining a quality score for the selected query;
   determining navigation score for the selected query; and
   determining that the selected query is a candidate query if the quality score of the selected query is less than the quality score threshold and the navigation score of the selected query is less than the navigation score threshold.

20. The system of claim 19, wherein selecting candidate query further comprises determining the selected query is a candidate query only if a probability of revision from the candidate query to the revised query to is greater than a probability of entry of the revised query.

21. The system of claim 17, wherein determining a quality score for the revised query comprises:
   determining resource metrics for each resource identified by a search engine in response to the revised query, the resource metrics including one or more of an authority score and a search result click-through rate; and
   determining revision metrics for the revised query, the revision metrics including one or more of a revision frequency and a revision time;
   wherein:
      the authority score is a score of a node in a link graph and that is representative of the resource;
      the revision frequency is frequency at which the revised query is further revised in search sessions;
      the revision time is a time measured relative to the entry of the candidate query; and
      the click-through rate is a rate at which one or more search results for the revised query in response to the search operation are selected.

22. The system of claim 17, wherein:
   determining a navigation score for the revised query comprises:
      determining a traffic proportion for each resource identified by a search engine in response to the revised query, the traffic proportion being a proportion of traffic from search results generated in response to the query; and
      the navigation score threshold is a traffic proportion threshold; and
   identifying the navigational resource for the revised query comprises identify as the navigational resource a resource having a traffic proportion that exceeds the traffic proportion threshold.

23. The system of claim 17, wherein determining a navigation score for the revised query comprises determining navigational metrics for each resource identified by a search engine in response to the revised query, the navigational metrics including one or more of a cross linkage score, traffic proportion, and click-through rate.

24. A computer program product, encoded on a computer readable medium, operable to cause a data processing apparatus to perform operations comprising:
   selecting a candidate query in a query sequence stored in a query log, the query sequence including an initial query and one or more revised queries and defining an order in which the queries were submitted for a search session;
   selecting a revised query subsequent to the candidate query in the order;
   determining a quality score for the revised query;
   determining a navigation score for the revised query; and
   determining that the quality score for the revised query is greater than a quality score threshold and that the navigation score for the revised query is greater than a navigation score threshold, and in response:
      identifying a navigational resource for the revised query; and
      associating the navigational resource with the candidate query, the association specifying the navigational resource as being relevant to the candidate query in a search operation.

25. A computer-implemented method, comprising:
   selecting a candidate query in a query sequence stored in a query log, the query sequence including an initial query and one or more revised queries and defining an order in which the queries were submitted for a search session;
   selecting a revised query subsequent to the candidate query in the order;
   determining a quality score for the revised query relative to the candidate query;
   determining a navigation score for the revised query; and
   determining that the quality score for the revised query satisfies a quality score threshold and that the navigation score for the revised query satisfies a navigation score threshold, and in response:
      identifying a navigational resource for the revised query; and
      associating the navigational resource with the candidate query, the association specifying the navigational resource as being relevant to the candidate query in a search operation.

26. The computer-implemented method of claim 25, wherein determining a quality score for the revised query relative to the candidate query comprises:
   determining a revision time for the revised query, the revision time being measured relative to the entry of the candidate query; and
   determining the quality score based on the revision time.

27. The computer-implemented method of claim 25, wherein determining a quality score for the revised query relative to the candidate query comprises:
   determining one or more revision types for the revised query, the revision type including a synonym change, a term degree change, and an operator change; and
   determining the quality score based on the one or more revision types.

28. The computer-implemented method of claim 1, wherein the quality score is based on at least one resource metric of resources identified in response to the revised query, and the navigation score is based on at least one navigation metric of resources identified in response to the revised query.

29. The system of claim 17, wherein the quality score is based on at least one resource metric of resources identified in response to the revised query, and the navigation score is based on at least one navigation metric of resources identified in response to the revised query.

30. The computer program product of claim 24, wherein the quality score is based on at least one resource metric of resources identified in response to the revised query, and the navigation score is based on at least one navigation metric of resources identified in response to the revised query.

31. The computer-implemented method of claim 25, wherein the quality score is based in part on at least one resource metric of resources identified in response to the revised query, and the navigation score is based on at least one navigation metric of resources identified in response to the revised query.

32. The system of claim 17, wherein each query sequence is a collection of queries that were input for the search session within a revision window time period that defines a maximum time period between the input of a query and a subsequent query in a query sequence.

33. The system of claim 17, wherein selecting each query sequence for a search session comprises selecting a query sequence in which the initial query and subsequent queries belong to a same topic cluster.

34. The system of claim 17, wherein the candidate query is further selected in response to determining that the quality score for the revised query is greater than the quality score threshold and that the navigation score for the revised query is greater than the navigation score threshold.

35. The system of claim 34, wherein the selected query is further determined to be a candidate query only if a probability of revision from the selected query to the revised query to is greater than a probability of entry of the revised query.

36. The system of claim 17, wherein determining a navigation score for the revised query comprises:
- determining a traffic proportion for each resource identified by a search engine in response to the revised query, the traffic proportion being a proportion of traffic from search results generated in response to the query; and
- the navigation score threshold is a traffic proportion threshold.

37. The system of claim 36, wherein identifying the navigational resource for the revised query comprises identifying as the navigational resource a resource having a traffic proportion that exceeds the traffic proportion threshold.

38. The system of claim 17, wherein determining a navigation score for the revised query comprises:
- determining a click-through rate for each resource identified by a search engine in response to the revised query, the click-through rate being a rate at which search results generated in response to the query and referencing the resource were selected; and
- wherein the navigation score threshold is a click-through rate threshold.

39. The system of claim 38, wherein identifying the navigational resource for the revised query comprises identifying as the navigational resource the resource having a click-through rate that exceeds the click-through rate threshold.

40. The system of claim 17, wherein the search operation, responsive to receiving an input query, generates a corresponding relevance score for each of a plurality of resources, each relevance score measuring a relevance of the resource to the input query, and wherein the computer-readable medium storing instructions executable by the data processing apparatus upon execution causes the data processing apparatus to perform operations further comprising:
- receiving from a search session an input query for the search operation;
- determining that the input query matches the candidate query and in response increasing the relevance score of the navigational resource associated with the candidate query;
- generating a set of search results, each search result including a corresponding resource locator that specifies the location of a corresponding resource, at least one of the corresponding resources being the navigational resource;
- ordering the search results according to the relevance scores of the corresponding resources; and
- providing the search results for the search session.

41. The system of claim 17, wherein the search operation, responsive to receiving an input query, generates a set search results responsive to the input query, each search result including a corresponding resource locator that specifies the location of a corresponding resource and ranked according to a first order, wherein the computer-readable medium storing instructions executable by the data processing apparatus upon execution causes the data processing apparatus to perform operations further comprising:
- receiving from a search session an input query for the search operation;
- determining that the input query matches the candidate query and determining that one of the search results includes a corresponding resource locator referencing the navigational resource, and in response increasing the rank of the search result that includes the resource locator referencing the navigational resource to rank the search results according to a second order; and
- providing the set of search results ranked according to the second order for the search session.

42. The system of claim 17, wherein determining a quality score for the revised query comprises determining a quality score for the revised query relative to the candidate query.

43. A system, comprising:
- a data processing apparatus having accesses to a data store storing:
  - a query log storing query sequences for search sessions, each query sequence being a sequence including an initial query and one or more revised queries and defining an order in which the queries were submitted for a search session; and
  - a click log storing selection data defining actions taken responsive to search results provided for the search sessions, the search results provided in response to the queries and each search result including a corresponding resource locator that specifies the location of a corresponding resource;
- a computer-readable medium storing instructions executable by the data processing apparatus and upon such execution cause the data processing apparatus to perform operations comprising:
- selecting a candidate query in a query sequence;
- selecting a revised query subsequent to the candidate query in the order;
- determining a quality score for the revised query relative to the candidate query;
- determining a navigation score for the revised query; and
- determining that the quality score for the revised query satisfies a quality score threshold and that the navigation score for the revised query satisfies a navigation score threshold, and in response:
  - identifying a navigational resource for the revised query; and
  - associating the navigational resource with the candidate query, the association specifying the navigational resource as being relevant to the candidate query in a search operation.

44. The system of claim 43, wherein determining a quality score for the revised query relative to the candidate query comprises:
- determining a revision time for the revised query, the revision time being measured relative to the entry of the candidate query; and
- determining the quality score based on the revision time.

45. The system of claim 43, wherein determining a quality score for the revised query relative to the candidate query comprises:
- determining one or more revision types for the revised query, the revision type including a synonym change, a term degree change, and an operator change; and
- determining the quality score based on the one or more revision types.

46. The system of claim 43, wherein the quality score is based in part on at least one resource metric of resources identified in response to the revised query, and the navigation score is based on at least one navigation metric of resources identified in response to the revised query.

47. The computer program product of claim 24, wherein selecting the candidate query in the query sequence comprises selecting a query that has a navigation score less than the navigation score threshold and that has a quality score less than the quality score threshold.

48. The computer program product of claim 47, wherein the query sequence is a collection of queries that were input for the search session within a revision window time period that defines a maximum time period between the input of a query and a subsequent query in a query sequence.

49. The computer program product of claim 24, wherein selecting the query sequence for a search session comprises selecting a query sequence in which the initial query and subsequent queries belong to a same topic cluster.

50. The computer program product of claim 24, wherein the candidate query is further selected in response to determining that the quality score for the revised query is greater than the quality score threshold and that the navigation score for the revised query is greater than the navigation score threshold.

51. The computer program product of claim 50, wherein selecting the candidate query comprises:
  selecting a query that is prior to the revised query in the query sequence;
  determining a quality score for the selected query;
  determining a navigation score for the selected query; and
  determining the selected query is a candidate query if the quality score of the selected query is less than the quality score threshold and the navigation score of the selected query is less than the navigation score threshold.

52. The computer program product of claim 50, wherein the selected query is further determined to be a candidate query only if a probability of revision from the selected query to the revised query to is greater than a probability of entry of the revised query.

53. The computer program product of claim 24, wherein determining a quality score for the revised query comprises:
  determining resource metrics for each resource identified by a search engine in response to the revised query, the resource metrics including one or more of an authority score and a search result click-through rate; and
  determining revision metrics for the revised query, the revision metrics including one or more of a revision frequency and a revision time;
  wherein:
    the authority score is a score of a node in a link graph and that is representative of the resource;
    the revision frequency is frequency at which the revised query is further revised in search sessions;
    the revision time is a time measured relative to the entry of the candidate query; and
    the click-through rate is a rate at which one or more search results for the revised query in response to the search operation are selected.

54. The computer program product of claim 24, wherein determining a navigation score for the revised query comprises determining navigational metrics for each resource identified by a search engine in response to the revised query, the navigational metrics including one or more of a cross linkage score, traffic proportion, and click-through rate.

55. The computer program product of claim 24, wherein determining a navigation score for the revised query comprises:
  determining a traffic proportion for each resource identified by a search engine in response to the revised query, the traffic proportion being a proportion of traffic from search results generated in response to the query; and
  the navigation score threshold is a traffic proportion threshold.

56. The computer program product of claim 55, wherein identifying the navigational resource for the revised query comprises identifying as the navigational resource a resource having a traffic proportion that exceeds the traffic proportion threshold.

57. The computer program product of claim 24, wherein determining a navigation score for the revised query comprises:
  determining a click-through rate for each resource identified by a search engine in response to the revised query, the click-through rate being a rate at which search results generated in response to the query and referencing the resource were selected; and
  wherein the navigation score threshold is a click-through rate threshold.

58. The computer program product of claim 57, wherein identifying the navigational resource for the revised query comprises identifying as the navigational resource the resource having a click-through rate that exceeds the click-through rate threshold.

59. The computer program product of claim 24, wherein the search operation, responsive to receiving an input query, generates a corresponding relevance score for each of a plurality of resources, each relevance score measuring a relevance of the resource to the input query, and wherein the operations further comprise:
  receiving from a search session an input query for the search operation;
  determining that the input query matches the candidate query and in response increasing the relevance score of the navigational resource associated with the candidate query;
  generating a set of search results, each search result including a corresponding resource locator that specifies the location of a corresponding resource, at least one of the corresponding resources being the navigational resource;
  ordering the search results according to the relevance scores of the corresponding resources; and
  providing the search results for the search session.

60. The computer program product of claim 24, wherein the search operation, responsive to receiving an input query, generates a set search results responsive to the input query, each search result including a corresponding resource locator that specifies the location of a corresponding resource and ranked according to a first order, and wherein the operations further comprise:
  receiving from a search session an input query for the search operation;
  determining that the input query matches the candidate query and determining that one of the search results includes a corresponding resource locator referencing the navigational resource, and in response increasing the rank of the search result that includes the resource locator referencing the navigational resource to rank the search results according to a second order; and
  providing the set of search results ranked according to the second order for the search session.

61. The computer program product of claim 24, wherein determining a quality score for the revised query comprises determining a quality score for the revised query relative to the candidate query.

* * * * *

UNITED STATES PATENT AND TRADEMARK OFFICE
CERTIFICATE OF CORRECTION

| | | |
|---|---|---|
| PATENT NO. | : 8,326,826 B1 | Page 1 of 1 |
| APPLICATION NO. | : 12/354426 | |
| DATED | : December 4, 2012 | |
| INVENTOR(S) | : Trystan G. Upstill | |

It is certified that error appears in the above-identified patent and that said Letters Patent is hereby corrected as shown below:

In Claim 7, Line 43, Column 18, delete "to is" and insert -- is --, therefor.

In Claim 20, Line 66, Column 20, delete "to is" and insert -- is --, therefor.

In Claim 35, Line 66-67, Column 22, delete "to is" and insert -- is --, therefor.

In Claim 52, Line 24, Column 25, delete "to is" and insert -- is --, therefor.

Signed and Sealed this
Nineteenth Day of March, 2013

Teresa Stanek Rea
*Acting Director of the United States Patent and Trademark Office*

UNITED STATES PATENT AND TRADEMARK OFFICE
CERTIFICATE OF CORRECTION

| | | |
|---|---|---|
| PATENT NO. | : 8,326,826 B1 | Page 1 of 1 |
| APPLICATION NO. | : 12/354426 | |
| DATED | : December 4, 2012 | |
| INVENTOR(S) | : Upstill et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 697 days.

Signed and Sealed this
Sixteenth Day of December, 2014

Michelle K. Lee
*Deputy Director of the United States Patent and Trademark Office*